(12) United States Patent
Duet et al.

(10) Patent No.: US 10,721,751 B2
(45) Date of Patent: Jul. 21, 2020

(54) FACILITATION OF EFFICIENT SPECTRUM UTILIZATION FOR 5G OR OTHER NEXT GENERATION NETWORKS

(71) Applicant: AT&T Intellectual Property I, L.P., Atlanta, GA (US)

(72) Inventors: Douglas Duet, Roswell, GA (US); Yuang Lou, Dunwoody, GA (US); George Hirvela, Carrollton, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 3 days.

(21) Appl. No.: 15/614,107

(22) Filed: Jun. 5, 2017

(65) Prior Publication Data

US 2018/0352559 A1    Dec. 6, 2018

(51) Int. Cl.
*H04W 72/12* (2009.01)
*H04L 12/26* (2006.01)
*H04L 12/861* (2013.01)
*H04W 72/04* (2009.01)

(52) U.S. Cl.
CPC .... *H04W 72/1231* (2013.01); *H04W 72/0453* (2013.01); *H04W 72/1268* (2013.01); *H04W 72/1278* (2013.01)

(58) Field of Classification Search
CPC ......... H04W 72/1231; H04W 72/0453; H04W 72/1284; H04L 43/0888; H04L 49/9005
See application file for complete search history.

(56) References Cited

U.S. PATENT DOCUMENTS

| | | | |
|---|---|---|---|
| 8,032,145 | B2 | 10/2011 | Ji |
| 8,861,458 | B2 | 10/2014 | Dai et al. |
| 9,072,113 | B2 | 6/2015 | Lorca Hernando |
| 9,119,216 | B2 | 8/2015 | Berberana Fernandez-Murias et al. |
| 9,414,396 | B2 | 8/2016 | Aydin et al. |
| 9,516,629 | B2 | 12/2016 | Amirijoo et al. |
| 9,591,649 | B1 | 3/2017 | Liu et al. |
| 2011/0268087 | A1* | 11/2011 | Kwon ............... H04L 5/0005 370/331 |
| 2013/0329665 | A1 | 12/2013 | Kadous et al. |

(Continued)

FOREIGN PATENT DOCUMENTS

WO    2015055243 A1    4/2015

*Primary Examiner* — Awet Haile
(74) *Attorney, Agent, or Firm* — Amin, Turocy & Watson, LLP

(57) ABSTRACT

Spectral efficiency for a 5G network, or other next generation networks, can be increased via a resource scheduler of a network node. The resource scheduler can receive a first signal from a mobile device of a wireless network. The first signal can comprise resource request data representative of a first request for a resource of the wireless network. In response to receiving the first signal, the resource scheduler can transmit a second signal to the mobile device via a network device of the wireless network, wherein the second signal can comprise buffer status request data. The scheduler can receive a third signal from the mobile device, wherein the third signal can comprise buffer status data associated with the buffer, and based on comparing bandwidth data to the buffer status data, the scheduler can assign the resource channel to the mobile device.

20 Claims, 12 Drawing Sheets

(56) References Cited

U.S. PATENT DOCUMENTS

| | | |
|---|---|---|
| 2015/0078294 A1* | 3/2015 | Yang ................... H04W 72/048 370/329 |
| 2015/0237645 A1* | 8/2015 | Andrianov ........ H04W 72/1215 370/329 |
| 2016/0037380 A1 | 2/2016 | Ozturk et al. |
| 2016/0044690 A1 | 2/2016 | Li et al. |
| 2016/0057729 A1* | 2/2016 | Horn ..................... H04W 48/18 455/458 |
| 2016/0183281 A1 | 6/2016 | Yeh et al. |
| 2016/0234841 A1 | 8/2016 | Pao et al. |
| 2016/0337094 A1* | 11/2016 | Andreoli-Fang ............................ H04W 72/1284 |
| 2017/0013641 A1 | 1/2017 | Patel et al. |
| 2017/0164377 A1* | 6/2017 | Ho ........................ H04W 16/28 |
| 2017/0265106 A1* | 9/2017 | Andreoli-Fang ............................ H04W 28/0268 |

\* cited by examiner

FACILITATION OF EFFICIENT SPECTRUM UTILIZATION FOR 5G OR OTHER NEXT GENERATION NETWORKS

TECHNICAL FIELD

This disclosure relates generally to facilitating resource allocation to increase spectral efficiency. For example, this disclosure relates to facilitating spectral efficiency via a resource scheduler for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity (Wi-Fi) hotspots. 5G research and development also aims at improved support of machine-to-machine communication, also known as the Internet of Things (IOT), aiming at lower cost, lower battery consumption and lower latency than 4G equipment.

The above-described background relating to a non-orthogonal design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
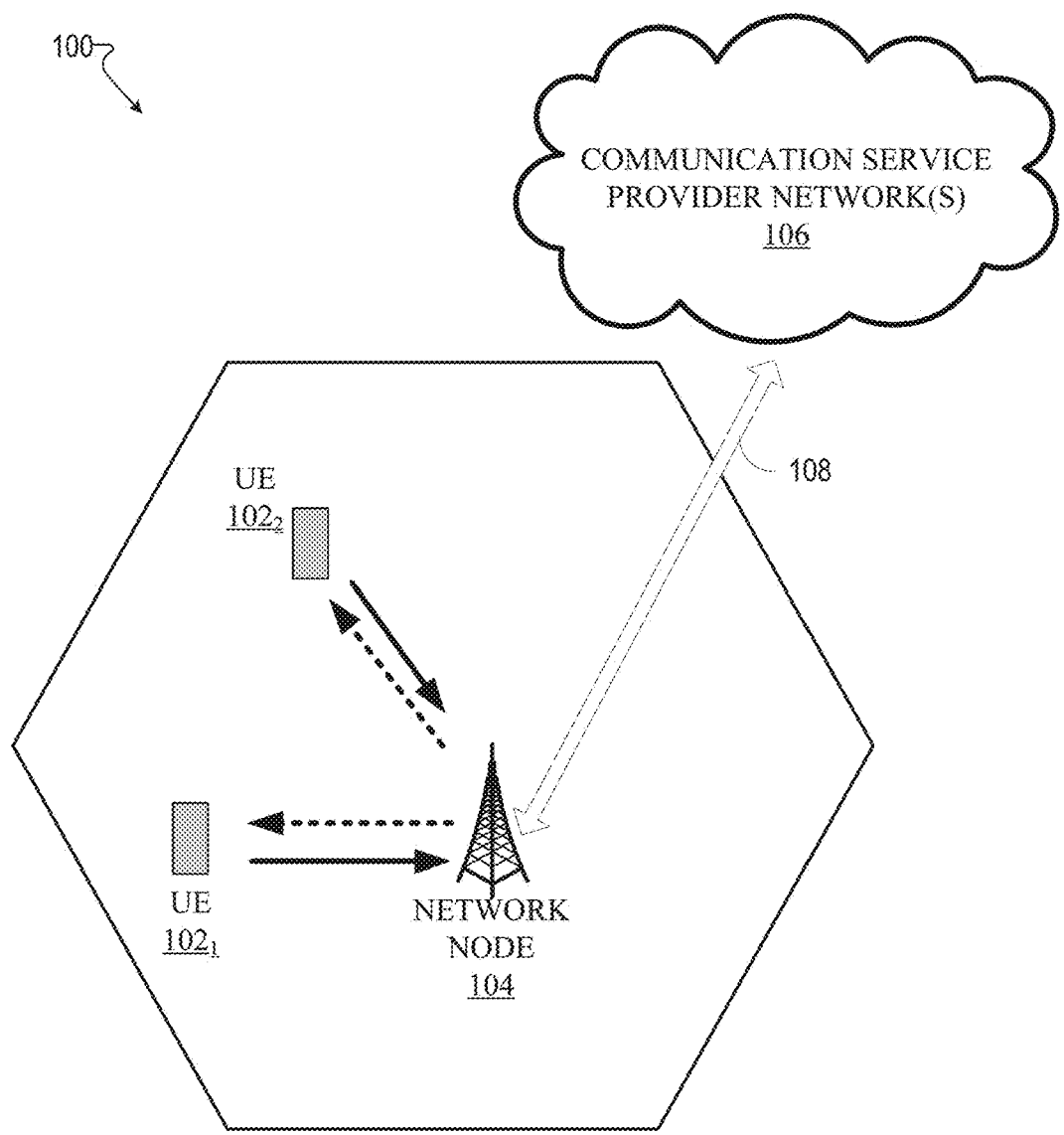
FIG. 1 illustrates an example of a wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate facilitating spectral efficiency for 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate spectral efficiency via a resource scheduler for a 5G network. Facilitating spectral efficiency for a 5G network can be implemented in connection with any type of device with a connection to the communications network (e.g., a mobile handset, a computer, a handheld device, etc.) any Internet of Things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (CRAN) can enable the implementation of concepts such as software-defined network (SDN) and network function virtualization (NFV) in 5G networks. This disclosure can facilitate a generic channel state information framework design for a 5G network. Certain embodiments of this disclosure can comprise a SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The RAN can comprise elements of various radio access technologies (RAT) including, an enhanced NodeB of LTE and a NodeB of UMTS. The GSM RAT comprises a base transceiver station (BTS). The network core can comprise elements, which are shared between the two remaining RATs and some elements, which are dedicated to the individual RATs. The LTE enhanced packet core can comprise the following elements—the serving gateway (S-GW), the mobility management entity (MME) and the packet data network gateway (P-GW). The UMTS Core Network carries both circuit switched and packet switched traffic and, therefore, has elements to serve each mode of traffic. The shared UMTS network element is the radio network controller (RNC). The traffic related UMTS network elements are the mobile switching center (MSC), and the gateway mobile switching center (GMSC) for circuit switched traffic. For packet switched traffic is related to the serving GPRS support node (SGSN) and the gateway GPRS support node (GGSN). Additional network core elements include the Policy and Charging Rules Function (PCRF) and the Home Subscriber Server (HSS).

For LTE, radio related control functions can reside in the RAN eNodeB, and for UMTS, radio related control functions can reside in the RNC. These control functions can comprise radio admission control, resource allocation control, and dynamic resource allocation, which for LTE is done in the eNodeB's scheduler, and for UMTS it is done in the RNC. The protocols of each technology can be similar and comprise a stack having three layers. Layer 1 can be a physical layer (physical channels in the uplink and downlink), layer 2 can be a radio link control (RLC), medium access control (MAC), and/or packet data convergence protocol control (PDCPC), and layer 3 can be a radio resource control (RRC), non access stratum (NAS) and/or an Internet Protocol (IP).

Layer 1 can carry information from the MAC channels over the air interface and take care of (1) the link control, (2) the power control, and (3) the cell search. Layer 2's MAC sub-layer can be responsible for mapping logical channels and transport channels, multiplexing and de-multiplexing channel units to and from transport blocks from the physical layer, and allocating resources. Layer 2's RLC sub-layer can be responsible for the transfer of upper layer protocol data units and traffic units. Layer 2's PDCPC sub-layer can be responsible for the routing, error correction, and maintenance of IP data. Layer 3's RRC sub-layer can be responsible for the broadcast of system information related to the NAS, broadcast of system information related to the access stratum, paging, establishment, maintenance and release of an RRC connection between the UE and the RAN, and security functions. Layer 3's NAS protocol sub-layer can form the highest stratum of the control plane between the UE and the MME. NAS protocols support the mobility of the UE and the session management procedures to establish and maintain IP connectivity between the UE and the packet data network gateway. The elements that control the allocation of spectrum resources can reside in each technology's network (e.g., UMTS—RNC and LTE—scheduler) that do not work together at the resource allocation level.

When a UE first powers on, it searches for cells to access. The channel (frequency) used to search for cells to access can be based on the last channel that the UE used, the bands the UE supports, and/or previous frequencies used by the UE. After a successful search for a cell to access, the UE can send a capabilities report to the eNodeB in the cell it accessed. The capabilities report can provide the network with the UE's category, supported frequency bands, carrier aggregation band combinations, sync signal sequence, general radio resource info (supported feature groups, etc.), general MIMO parameters, the duplex mode, and/or the preamble sequence generation algorithm. The UE can synchronize with the eNodeB's downlink signal and can decode the broadcast channel and read the system information blocks sent by the eNodeB that the UE has found. The system information blocks in LTE comprise the master information block and the system information blocks. The master information block (MIB) can contain essential system information including: (1) system frame number, (2) the downlink system bandwidth of the channel it is using, (3) the period of the MIB (e.g., every four radio frames, etc.), and/or (4) the number of transmit antennas. The SIB data can comprise info on (1) how other SIBs are scheduled and cell access parameters, (2) access information (e.g., common and shared control channel information), (3) cell reselection parameters for the serving cell, (4) intra-frequency neighbors—idle only, (5) inter-frequency cell selection information—idle only, (6) WCDMA cell reselection information, and GSM cell reselection information. Embedded in one of the SIBs are the absolute priorities of available wireless technologies in the cell. For example, the wireless technology priorities in the SIB can be represented as shown in Table 1.

TABLE 1

SIB Wireless Technology Priorities

| Technology and Application | Priority | Comment |
|---|---|---|
| Future Use | 7 | Highest Priority |
| LTE - Indoor Small Cells/FEMTO | 6 | |
| UMTS - Indoor Small Cells/FEMTO | 5 | |
| Future Use | 4 | |
| LTE MB & HB - Macro/Outdoor Small Cells | 3 | |
| LTE LB - Macro/Outdoor Small Cells | 2 | |
| UMTS - Macro/Outdoor Small Cells | 1 | |
| GSM | 0 | Lowest Priority |

When the UE is camping on a cell but has nothing to transmit, it can be in an idle state. In the idle state, the UE can perform five different processes including, but not limited to: (1) reading the system information, (2) public land mobile network selection and reselection processes, (3) cell selection and reselection processes, (4) tracking area updates, and (5) responding to pages. When the UE has something to transmit, it can send a scheduler request to the eNodeB's scheduler residing in the MAC sub-layer (e.g., for UMTS this request can go to the RNC). The scheduler can be the eNodeB's resource allocator. Algorithms used by the scheduler to allocate resources can be used to determine which UEs to schedule, how to allocate resources to them, and how to determine the appropriate power levels for each UE on each resource. Most approaches attempt to balance the desire for high throughputs, low latency, and fairness among the UEs. However, efficient spectrum utilization does not appear to be one of the tradeoffs in the scheduler's procedures.

The scheduler request does not specify the type or priority of the information to be transmitted. The scheduler can assign initial resources (e.g., resource blocks) without detailed knowledge of the UE's buffer content (e.g., information to be transmitted) on the RF channel that the UE was using to access the eNodeB (for UMTS the RNC can allocate orthogonal codes). In order for the scheduler to receive additional information from the UE, the scheduler can send a grant to the UE. Once the grant is received, the UE can send additional uplink information to the eNodeB including the UE buffer status report (e.g., size of the data to be transmitted) together with the uplink data. The buffer status report can provide the eNodeB with the amount of data in the UE's buffer that needs to be sent out. Since it would require too many bits to represent the real size of the data to be sent, the buffer status report can break down the data size into 64 different ranges and assign an index number to each of the ranges. The "buffer size" field in the buffer status report can represent the index number. There can be two formats to the buffer status reports—the standard format and the extended format. In the standard format, the index number "0" means there is no data to transmit, the index number "31" can represent a buffer size of 967 to 1132 bytes of data to be transmitted, and the index number "63" can represent that the buffer size is greater than 150 kilobytes. In the extended format, the index number "0" can represent that there is no data to transmit, the index number "31" can represent a buffer size of 4017 to 4940 bytes of data to be transmitted, and the index number "63" can represent that the buffer size is greater than 3 megabytes.

With the additional information from the UE and the UE's measured channel quality, the scheduler can assign the appropriate number of resource blocks to the UE for the uplink channel from the resource block pool of the RF channels that the UE has transmission and reception capabilities (e.g., provided in the capabilities report). Without carrier aggregation, the allocation can be on a single channel basis (e.g., the channel that the UE used for access). When assigning resource blocks, the scheduler can attempt to assign all allocated resource blocks together (e.g., adjacent, not separated).

For the downlink, the scheduler can perform periodization among users and among different applications running on a user's channel. The scheduler can provide downlink resources to the UE based on the UE measured channel quality indicator sent to the scheduler. The scheduler can provide QoS requirements based on the eNodeB's signal-to-noise and interference ratio (SNIR) measurements. The UE can monitor the control channel to determine if the eNodeB has data to send and where to find the scheduler data. Since channel assignments are determined in the network based on UE capabilities and there are two networks (e.g., UMTS and LTE) with two separate resource allocators (RNC and scheduler), changing the allocation procedure for UEs can allow the RNC and the scheduler to communicate and work together.

The procedures and processes from when the UE first powers on to when the UE receives a grant from the eNodeB scheduler will remain the same. The change in procedures to support improved spectrum utilization comes when the UE sends additional uplink information to the eNodeB that comprises the UE buffer status report together with uplink information. The scheduler currently can assign resources to UEs according to traffic demands, QoS requirements, and estimated channel quality. However, the present disclosure details the scheduler adding the selection of a resource based on resource channel bandwidths and the size of the data in the UE buffer. Examples of spectrum resource channel bandwidths are shown in Table 2.

TABLE 2

AT&T Spectrum Resource Channel Bandwidths

| Spectrum Resource | Resource Channel Bandwidths (MHz) |
|---|---|
| Band 2 (PCS) | 5, 10, and 20 |
| Band 4 (AWS) | 5, 10 and 20 |
| Band 5 (Cellular 850) | 5 and 10 |
| Band 12 (Lower 700) | 5 and 10 |
| Band 29 (CA) | 5 and 10 |
| Band 30 (WCS) | 5 and 10 |
| Band 66 (EAWS) | 5, 10 and 20 |
| Future MMW (28 GHz) | >100 |
| Future MMW (39 GHz) | >100 |

Before the scheduler allocates resources in the form of resource blocks, the scheduler can first compare the buffer status report's index number (e.g., size of the traffic demand) to the spectrum resource channel bandwidths available to determine the channel's available throughput capacity. Once the resource channel has been selected, the scheduler can instruct the UE to stay on its present channel or move to the new resource channel(s) and provide channel quality estimates. The scheduler can then, based on the new channel resources, QoS requirements, and estimated channel quality, assign resources to the UE for uplink traffic. Since the scheduler knows the size of all UE demands and the availability of all resources, assigning UEs with a larger amount of data in its buffer to resources with wider bandwidths can be a more efficient utilization of spectrum resources.

There are a number of possible approaches to this allocation implementation. Buffer sizes can be arbitrarily assigned to resource channel bandwidths (e.g., larger buffer sizes assigned to channels with larger bandwidths, medium buffer sizes assigned to channels with medium bandwidths, and smaller buffer sizes assigned to smaller bandwidth channels). A more efficient method of allocating resources based on UE buffer sizes can be performed using the designed number of simultaneous active UEs in a cell or sector. Assume that an eNodeB area is designed for 500 simultaneous users and an average throughput with a modulation coding scheme of MCS-9 (16 QAM, R=2/3) and no MIMO. The throughputs for various channel bandwidths under this scenario are shown in Table 3.

TABLE 3

Assumed Throughputs For Various Channel Bandwidths

| Channel Bandwidths (MHz) | Assumed Throughput (Mb/s) |
|---|---|
| 5 | 13.4 |
| 10 | 26.7 |
| 20 | 53.4 |
| >100 | >267 |

These throughputs can be increased if MIMO is implemented. The scheduler's resource assignments can be based on: (1) simultaneous users in a scheduler's assignment area ([eNodeB area throughput]/[number of simultaneous users]), (2) available resource channel bandwidths, and (3) UE buffer size level (e.g., from the buffer status report). The assignment table for this scenario is shown in Table, 4 using the standard buffer size levels, and Table 5, using the extended buffer size levels. A similar resource assignment table can be developed with other channel bandwidths.

TABLE 4

Scheduler Resource Assignments Based On Simultaneous Users and the Standard Buffer Table

| Buffer Status Report Index Number | Resource Channel Bandwidth (MHz) |
|---|---|
| 0 to 38 | 5 |
| 39 to 43 | 10 |
| 44 to 47 | 20 |
| 48 to 63 | >100 |

TABLE 5

Scheduler Resource Assignments Based On Simultaneous Users and the Extended Buffer Table

| Buffer Status Report Index Number | Resource Channel Bandwidth (MHz) |
|---|---|
| 0 to 30 | 5 |
| 31 to 33 | 10 |
| 34 to 36 | 20 |
| 37 to 63 | >100 |

With the above allocation implementation to improve the efficient use of the spectrum in a cell and with the scheduler in the eNodeB allocating resources in the area under its control, it is more efficient to have a centralized element controlling the resources in a given area. It can be more efficient to have one resource allocator in a sector than to have two separate resource allocators for the same area, such as one LTE scheduler in a sector versus one LTE scheduler and one UMTS RNC. The same can be said for the implementation of 5G in an area under the control of an LTE scheduler. It can be more efficient to have a single LTE scheduler in an area (e.g., sector or cell) to control the allocation of all resources with a 5G overlay implementation in the same area.

In one embodiment, described herein is a method comprising receiving a first signal representative of a scheduling request from a mobile device of a wireless network. In response to the receiving, the method comprises sending a second signal representative of a request for additional data, different from the scheduling request, to the mobile device. Also, in response to the sending, the method comprises receiving the additional data, wherein the additional data comprises uplink data relating to an uplink channel of the mobile device to the network device, and based on a bandwidth determined to be associated with a resource channel of the network device to the mobile device and further based on the additional data, the method comprises allocating an available resource of the wireless network to the mobile device.

According to another embodiment, a system can facilitate, receiving a first signal from a mobile device of a wireless network, wherein the first signal comprises resource request data representative of a first request for a resource of the wireless network. In response to the receiving the first signal, the system can facilitate sending a second signal to the mobile device via a network device of the of the wireless network, wherein the second signal comprises buffer status request data representative of a second request for a buffer status of a buffer. In response to the sending of the second signal, the system can facilitate receiving a third signal from the mobile device, wherein the third signal comprises buffer status data associated with the buffer. Furthermore, based on comparing bandwidth data, representative of a resource channel bandwidth associated with a resource channel usable to access the resource of the wireless network, to the buffer status data, the system can facilitate assigning the resource channel to the mobile device.

According to yet another embodiment, described herein is a machine-readable storage medium that can perform the operations comprising receiving request data representative of a resource request from a mobile device of a wireless network. In response to the receiving the request data, the machine-readable storage medium can perform the operations comprising sending a request for additional data, different than the resource request, to the mobile device. Furthermore, based on the request for the additional data, the machine-readable storage medium can perform the operations comprising receiving uplink data from the mobile device, wherein the uplink data comprises packet size data associated with a packet to be sent to a network device of the wireless network.

These and other embodiments or implementations are described in more detail below with reference to the drawings.

FIG. 1 illustrates an example wireless communication system 100 in accordance with various aspects and embodiments of the subject disclosure. In example embodiments, the wireless communication system 100 is or comprises a wireless communication network serviced by one or more wireless communication network providers. In example embodiments, the wireless communication system 100 can comprise one or more user equipment (UEs) 102 (e.g., $102_1$, $102_2$ ... $102n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
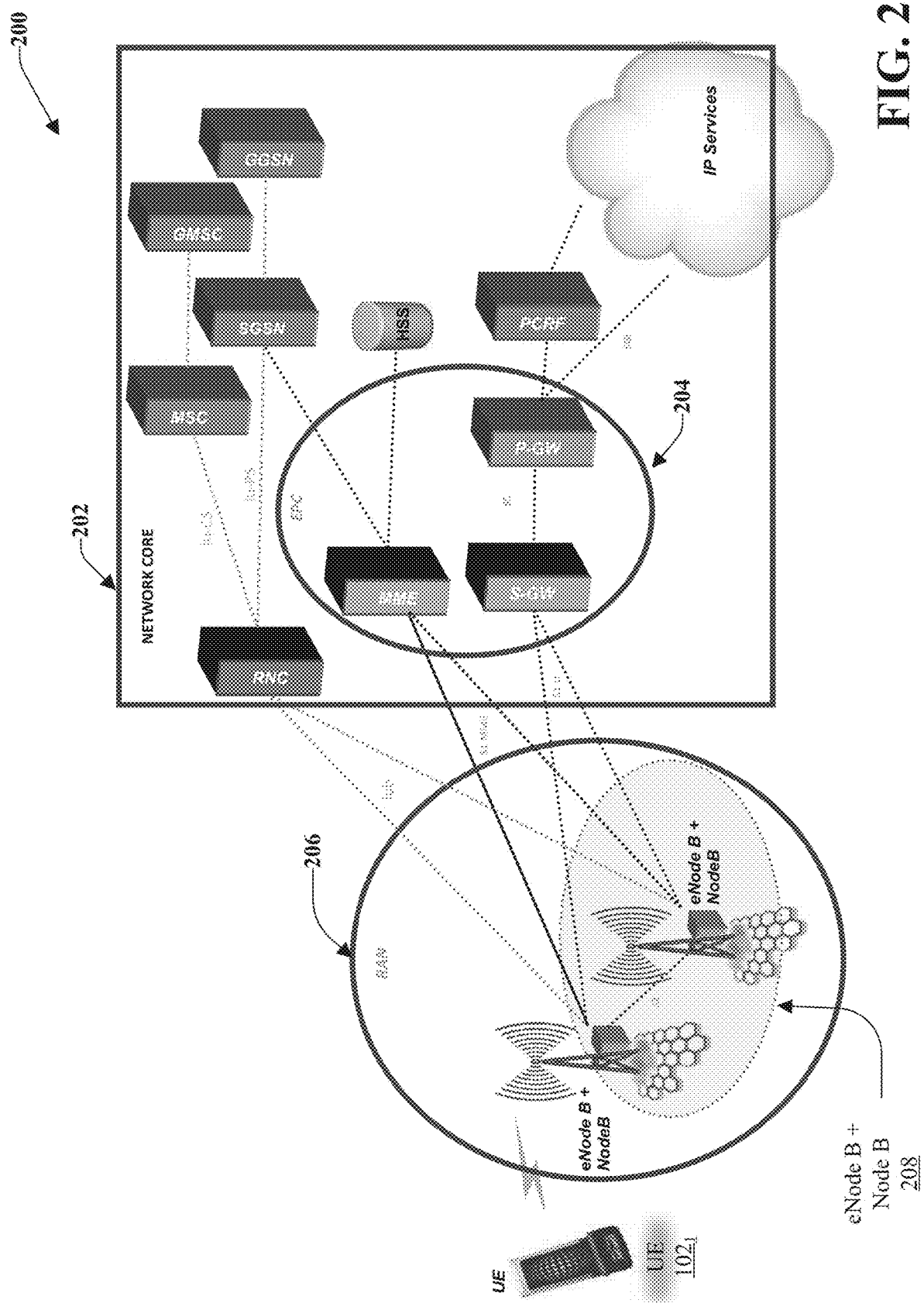
FIG. 2 illustrates an example schematic system block diagram of a wireless mobility network according to one or more embodiments.

Referring now to FIG. 2, illustrated is an example schematic system block diagram of wireless mobility network 200 according to one or more embodiments. The RAN 206 can comprise elements of various radio access technologies (RAT) including, an enhanced NodeB of LTE and a NodeB 208 of UMTS, which can be accessed by the user equipment $102_1$. A GSM RAT can comprise a base transceiver station (BTS). The network core 202 can comprise elements, which are shared between the enhanced NodeB of LTE and the NodeB 208 of UMTS and some elements, which are dedicated to the individual RATs. The LTE enhanced packet core 204 can comprise the following elements: the serving gateway (S-GW), the mobility management entity (MME) and the packet data network gateway (P-GW). The UMTS core network carries both circuit switched and packet switched traffic and, therefore, has elements to serve each mode of traffic. The shared UMTS network element is the radio network controller (RNC). The traffic related UMTS network elements are the mobile switching center (MSC), and the gateway mobile switching center (GMSC) for circuit switched traffic. For packet switched traffic, the serving GPRS support node (SGSN) and the gateway GPRS support node (GGSN). Additional network core elements can comprise the policy and charging rules function (PCRF) and the home subscriber server (HSS).

Figure 3:
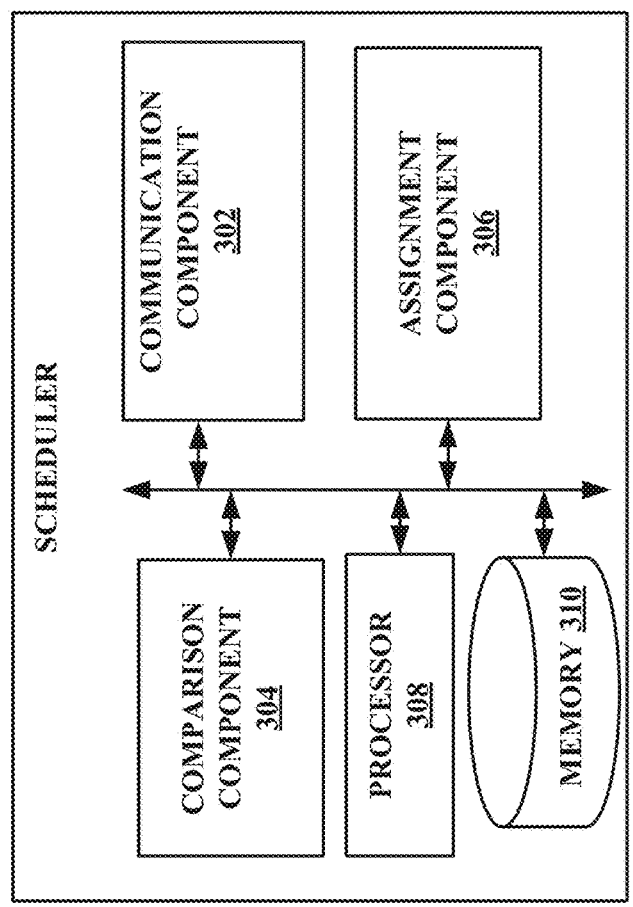
FIG. 3 illustrates another example schematic system block diagram of a scheduler component of the wireless mobility network according to one or more embodiments.

Referring now to FIG. 3, illustrated is an example schematic system block diagram of a scheduler 300 of the wireless mobility network according to one or more embodiments. It should be noted that the scheduler 300 sub-components (e.g., communication component 302, comparison component 304, and assignment component 306), processor 308, and memory 310 can bi-directionally communicate with each other. It should also be noted that in alternative embodiments that other components including, but not limited to the sub-components, processor 312, and/or memory 314, can be external to the scheduler 300. The UE $102_1$ can send a scheduler request to the scheduler 300 of the eNodeB 208. The scheduler 300 can allocate resources by sending a grant to the UE $102_1$, via the communication component 302. The communication component 302 can send and receive data to/from multiple UEs 102. Once the grant is received, the UE $102_1$ can send additional uplink information to the eNodeB 208 comprising a UE buffer status report (e.g., size of the data to be transmitted) together with the uplink data. The assignment component 306 can assign resources based on available resource channel bandwidths and the size of the data in the UE buffer from the buffer status report. Prior to the scheduler 300 allocating resources (based on a continuous CQI) in the form of resource blocks, the comparison component 304, of the scheduler 300, can first compare the buffer status report's index number (size of the traffic demand) to a spectrum resource channel bandwidth available to generate the channel's available throughput capacity. Once the resource channel has been selected, the scheduler 300 can instruct (e.g., via the communication component 302) the UE $102_1$ to stay on its present channel or move to a new resource channel(s) and provide channel quality estimates. The scheduler 300 can then, based on the new channel resources, QoS requirements, and estimated channel quality, assign resources to the UE $102_1$ for uplink traffic.

Aspects of the processor 308 can constitute machine-executable component(s) embodied within machine(s), e.g., embodied in one or more machine-readable mediums (or media) associated with one or more machines. Such component(s), when executed by the one or more machines (e.g., computer(s), computing device(s), virtual machine(s), etc.) can cause the scheduler 300 can also include memory 310 that stores computer executable components and instructions.

Since the scheduler knows the size of all user demands and the availability of all resources, assigning UEs with a larger amount of data in their buffer to resources with wider bandwidths can increase spectrum resource utilization efficiency. Other approaches can comprise arbitrarily assigning (e.g., via the assignment component 306) buffer sizes to resource channel bandwidths (e.g., assigning larger buffer sizes to channels with larger bandwidths, assigning medium buffer sizes to channels with medium bandwidths, and assigning smaller buffer sizes to channels with smaller bandwidths). The number of simultaneously active UEs can also be used to increase resource allocation efficiency. For example, when the network is designed, the maximum number of UEs (e.g. the eNodeB area can be designed for 500 simultaneous UE devices and an average throughput with no MIMO) that can communicate with the network can be known. Therefore, the scheduler's 300 resource assignments can be based on: (1) the number of simultaneous users in the scheduler's 300 assignment area (e.g., eNodeB area throughput]/number of simultaneous users]); (2) available resource channel bandwidths; and/or (3) a UE buffer size level, which can be continuously sent to scheduler 300 via the buffer status report.

Figure 4:
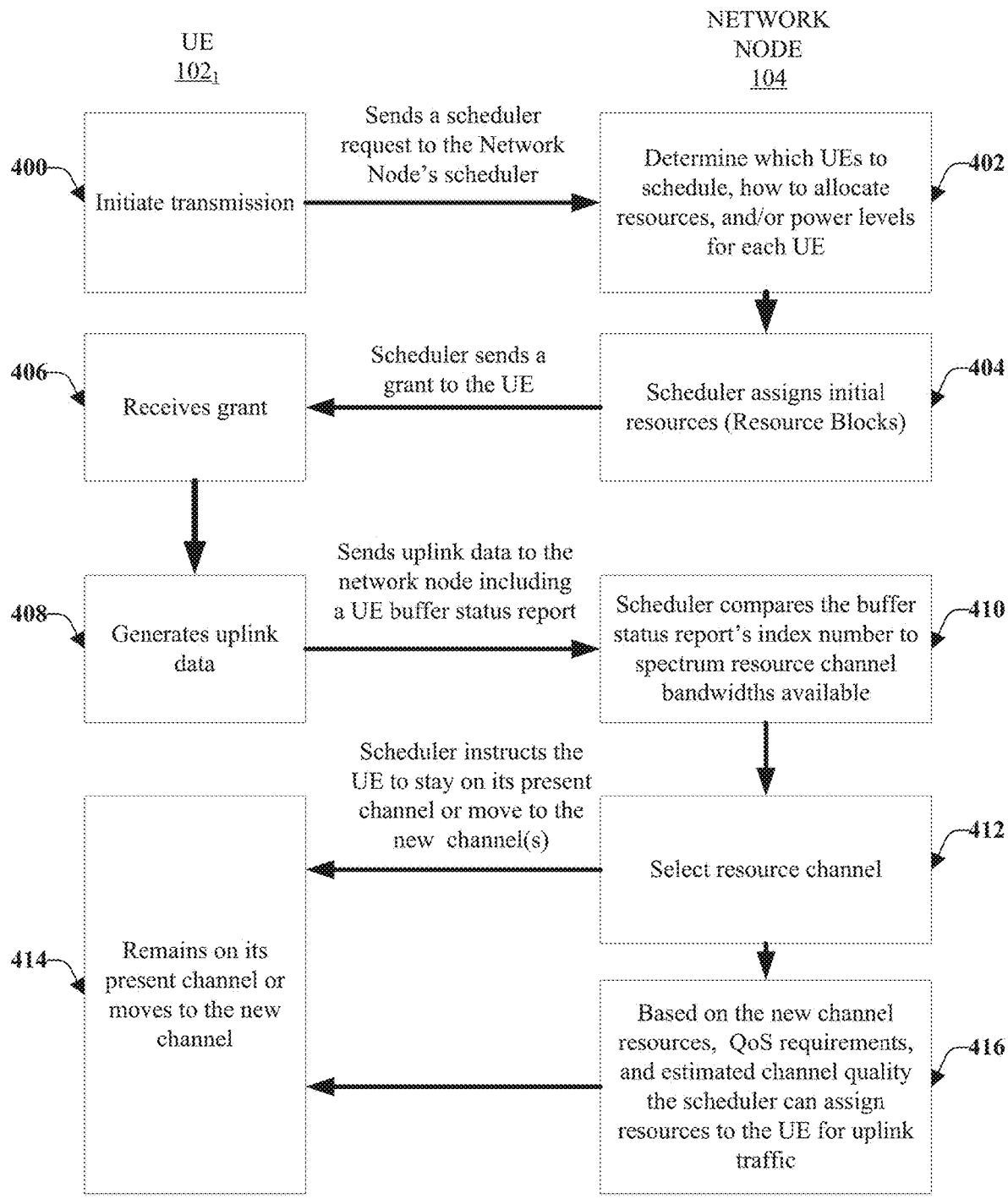
FIG. 4 illustrates an example schematic system block diagram of a resource selection for a wireless mobility network according to one or more embodiments.

Referring now to FIG. 4, illustrated is an example schematic system block diagram of a resource selection for a wireless mobility network according to one or more embodiments. At block 400, the UE $102_1$ can initiate a transmission to the network node 104. The transmission can comprise a scheduler request to the network node's scheduler 300. In response to receiving the scheduler request (e.g., via the communication component 302), the network node 104 can determine which UEs to schedule, how to allocate resources to the UEs, and/or power levels for each UE $102_1$ at block 402. The scheduler 300 can then assign (e.g., via the assignment component 306) a resource (e.g., resource block) to the UE $102_1$ and send a grant (e.g., via the communication component 302) to the UE $102_1$, which can grant the UE $102_1$ access to the resource. At block 406, the UE $102_1$ can receive the grant. Based on receiving the grant, the UE $102_1$ can generate uplink data at block 408 and send the uplink data to the network node 104. The uplink data can also comprise UE $102_1$ buffer status report data representative of a buffer status of the UE $102_1$.

At block 410, based on the uplink data received (e.g., via the communication component 302) by the network node 104, the scheduler 300 of the network node 104 can compare (e.g., via the comparison component 304) a buffer status report index number to available spectrum resource channel bandwidths and select a resource channel for the UE $102_1$ at block 412. Thereafter, the scheduler can instruct (e.g., via the communication component 302) the UE $102_1$ to stay on its present channel or move to a new channel. At block 414, based on the instructions received from the network node 104 scheduler 300, the UE $102_1$ can then remain on its present channel or move to the new channel. Additionally, based on the new channel resources, QoS requirements, and/or estimated channel quality, the scheduler 300 can assign (e.g., via the assignment component 306) resources to the UE for uplink traffic at block 416.

Figure 5:
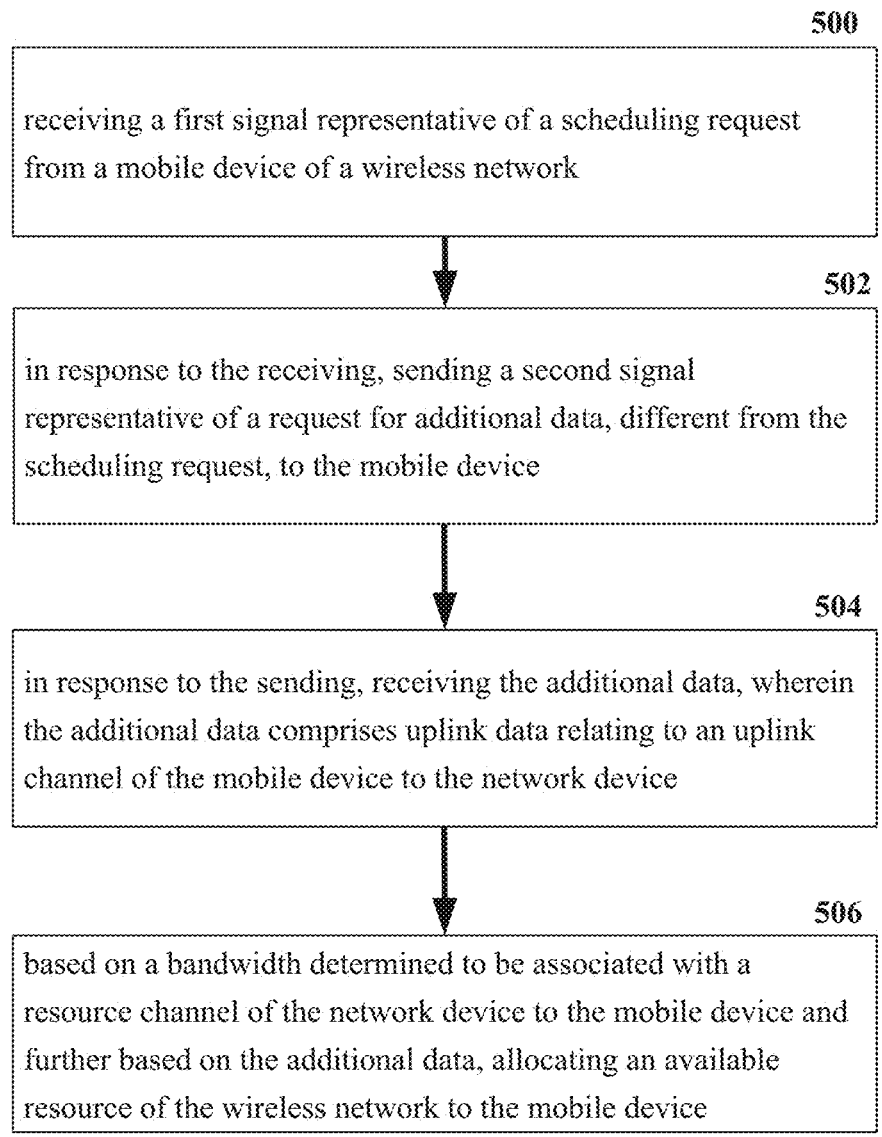
FIG. 5 illustrates an example flow diagram of a method for resource selection within a wireless mobility network according to one or more embodiments.

Referring now to FIG. 5 illustrates example flow diagram of a method for resource selection within a wireless mobility network according to one or more embodiments. At element 500, a first signal representative of a scheduling request from a mobile device of a wireless network can be received by the network node 104 (e.g., via the communication component 302). In response to the receiving, the network node can send (e.g., via the communication component 302) a second signal representative of a request for additional data, different from the scheduling request, to the mobile device at element 502. At element 504, in response to the sending (e.g., via the communication component 302), the network node 104 can receive (e.g., via the communication component 302) the additional data, wherein the additional data comprises uplink data relating to an uplink channel of the mobile device to the network device. Based on a bandwidth determined to be associated with a resource channel of the network device to the mobile device and further based on the additional data, the network node can allocate (e.g., via the assignment component 306) an available resource of the wireless network to the mobile device (e.g., UE) at element 506.

Figure 6:
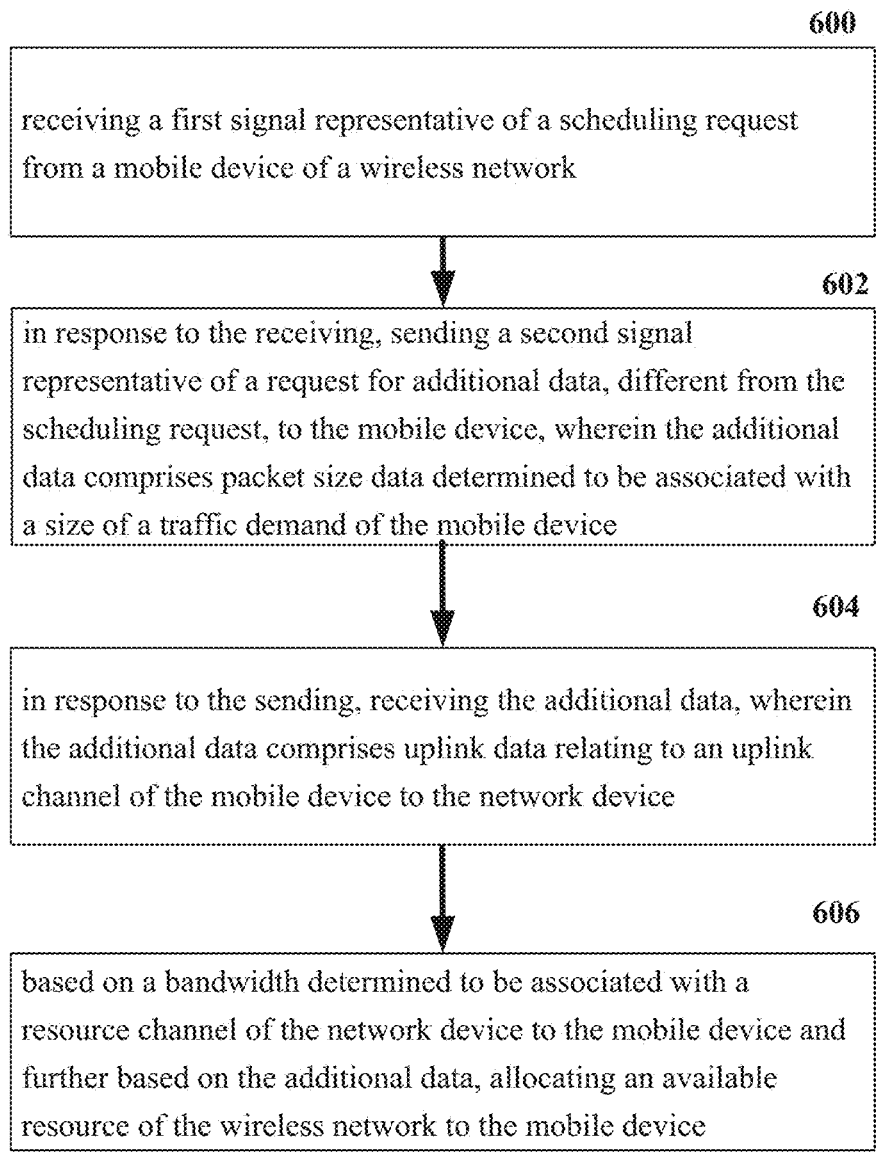
FIG. 6 illustrates an example flow diagram of a method for resource selection according to packet-sized data within a wireless mobility network according to one or more embodiments.

Referring now to FIG. 6, illustrated is an example of a method for resource selection according to packet-sized data within a wireless mobility network according to one or more embodiments. At element 600, a first signal representative of a scheduling request from a mobile device of a wireless network can be received by the network node 104 (e.g., via the communication component 302). In response to the receiving, the network node can send (e.g., via the communication component 302) a second signal representative of a request for additional data, different from the scheduling request, wherein the additional data comprises packet size data determined to be associated with a size of a traffic demand of the mobile device at element 602. At element 604, in response to the sending (e.g., via the communication component 302), the network node 104 can receive (e.g., via the communication component 302) the additional data, wherein the additional data comprises uplink data relating to an uplink channel of the mobile device to the network device. Based on a bandwidth determined to be associated with a resource channel of the network device to the mobile device and further based on the additional data, the network node can allocate (e.g., via the assignment component 306) an available resource of the wireless network to the mobile device (e.g., UE) at element 606.

Figure 7:
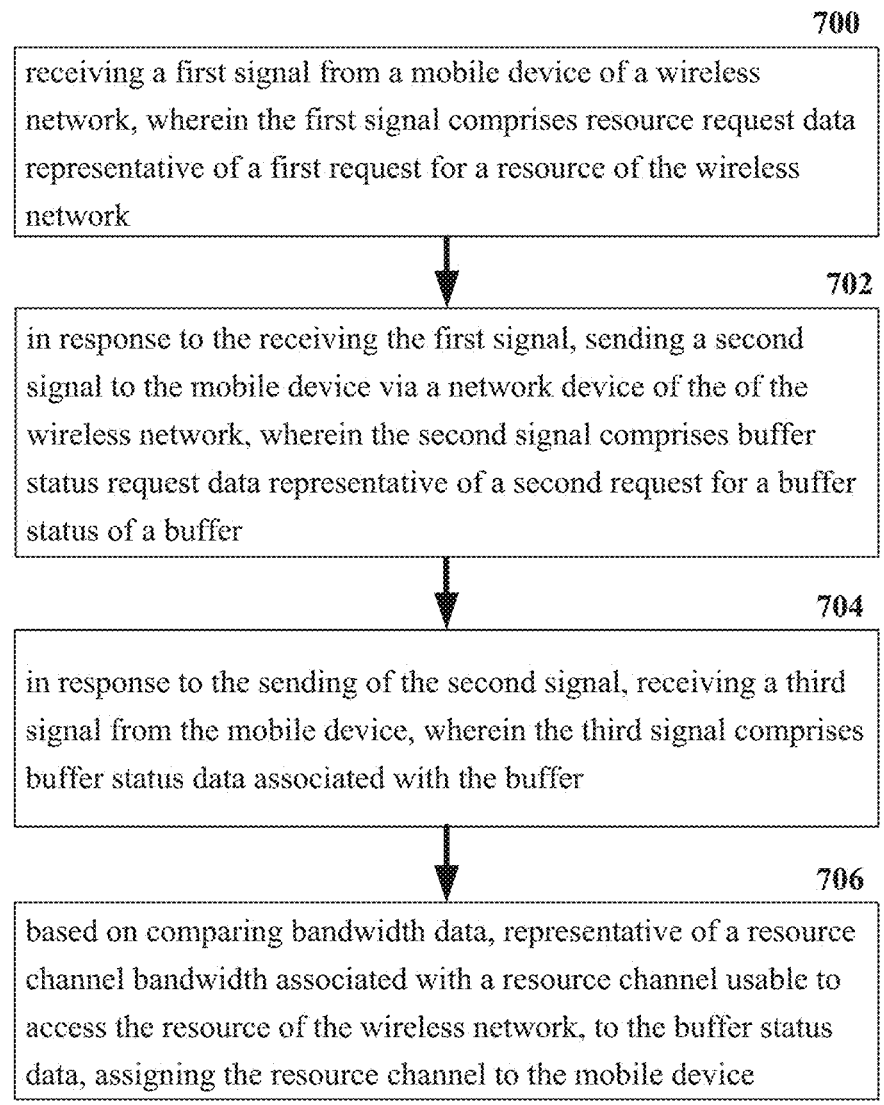
FIG. 7 illustrates an example flow diagram of a system for resource selection within a wireless mobility network according to one or more embodiments.

Referring now to FIG. 7, illustrated is an example flow diagram of a system for resource selection within a wireless mobility network according to one or more embodiments. At element 700, a first signal from a mobile device of a wireless network can be received (e.g., via the communication component 302) by the network node 104, wherein the first signal comprises resource request data representative of a first request for a resource of the wireless network. In response to the receiving the first signal, at element 702, a second signal can be transmitted (e.g., via the communication component 302) to the mobile device via a network device of the of the wireless network, wherein the second signal comprises buffer status request data representative of a second request for a buffer status of a buffer. In response to the sending of the second signal (e.g., via the communication component 302), a third signal can be received (e.g., via the communication component 302) from the mobile device, wherein the third signal comprises buffer status data associated with the buffer at element 704. At element 706, based on comparing bandwidth data (e.g., via the comparison component 304), representative of a resource channel bandwidth associated with a resource channel usable to access the resource of the wireless network, to the buffer status data, assigning (e.g., via the assignment component 306) the resource channel to the mobile device.

Figure 8:
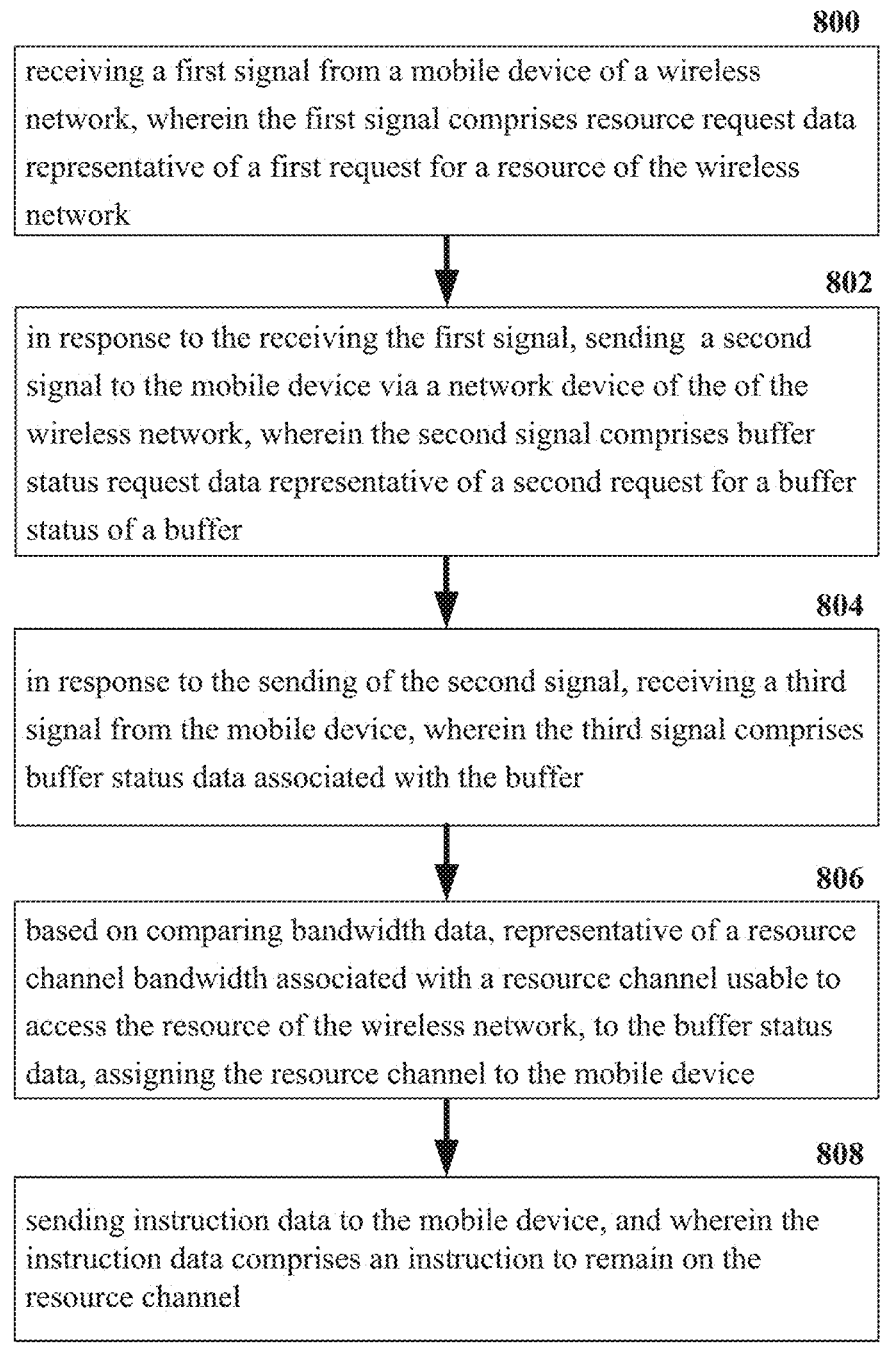
FIG. 8 illustrates an example flow diagram of a system for resource selection comprising an instruction for a mobile device to remain on a channel within a wireless mobility network according to one or more embodiments.

Referring now to FIG. 8, illustrated is an example flow diagram of a system for resource selection comprising an instruction for a mobile device to remain on a channel within a wireless mobility network according to one or more embodiments. At element 800, a first signal from a mobile device of a wireless network can be received (e.g., via the communication component 302) by the network node 104, wherein the first signal comprises resource request data representative of a first request for a resource of the wireless network. In response to the receiving the first signal, at element 802, a second signal can be transmitted (e.g., via the communication component 302) to the mobile device via a network device of the of the wireless network, wherein the second signal comprises buffer status request data representative of a second request for a buffer status of a buffer. In response to the sending of the second signal (e.g., via the communication component 302), a third signal can be received (e.g., via the communication component 302) from the mobile device, wherein the third signal comprises buffer status data associated with the buffer at element 804. At element 806, based on comparing bandwidth data (e.g., via the comparison component 304), representative of a resource channel bandwidth associated with a resource channel usable to access the resource of the wireless network, to the buffer status data, assigning (e.g., via the assignment component 306) the resource channel to the mobile device. Additionally, at element 808, instruction data can be sent (e.g., via the communication component 302) to the mobile device, and wherein the instruction data comprises an instruction to remain on the resource channel.

Figure 9:
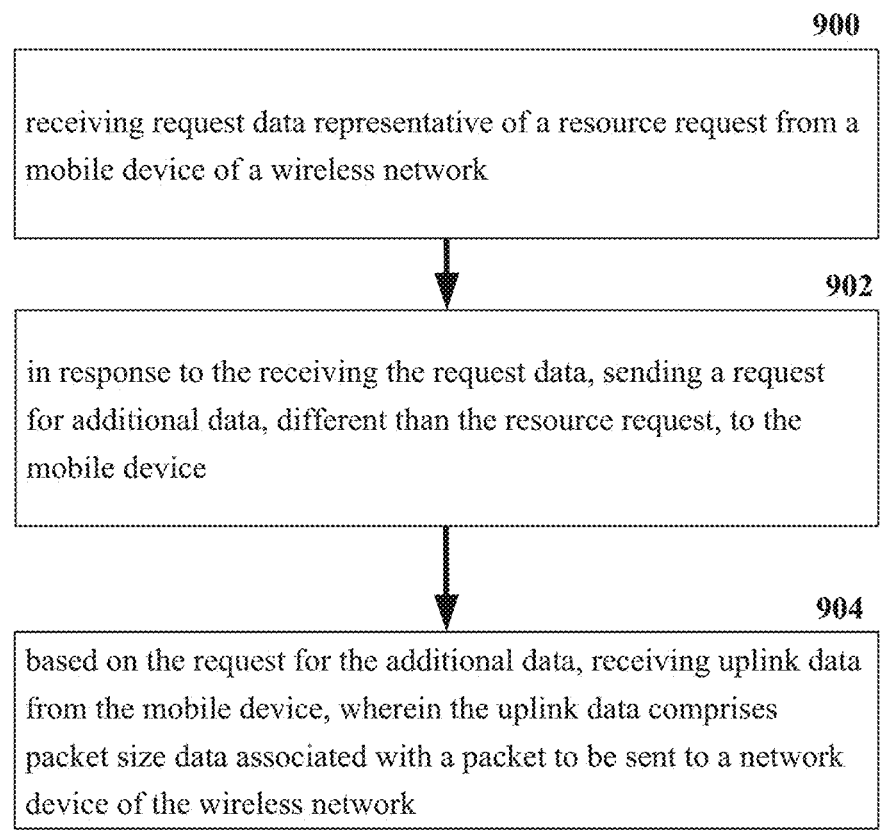
FIG. 9 illustrates an example flow diagram of a machine-readable medium for resource selection within a wireless mobility network according to one or more embodiments.

Referring now to FIG. 9, illustrates an example flow diagram of a machine-readable medium for resource selection within a wireless mobility network according to one or more embodiments. At element 900, the network node 104 can receive (e.g., via the communication component 302) request data representative of a resource request from a mobile device of a wireless network. At element 902, in response to the receiving the request data, the network node can send (e.g., via the communication component 302) a request for additional data, different than the resource request, to the mobile device. Based on the request for the additional data, the network node 104 can receive (e.g., via the communication component 302) uplink data from the mobile device, wherein the uplink data comprises packet size data associated with a packet to be sent to a network device of the wireless network at element 904.

Figure 10:
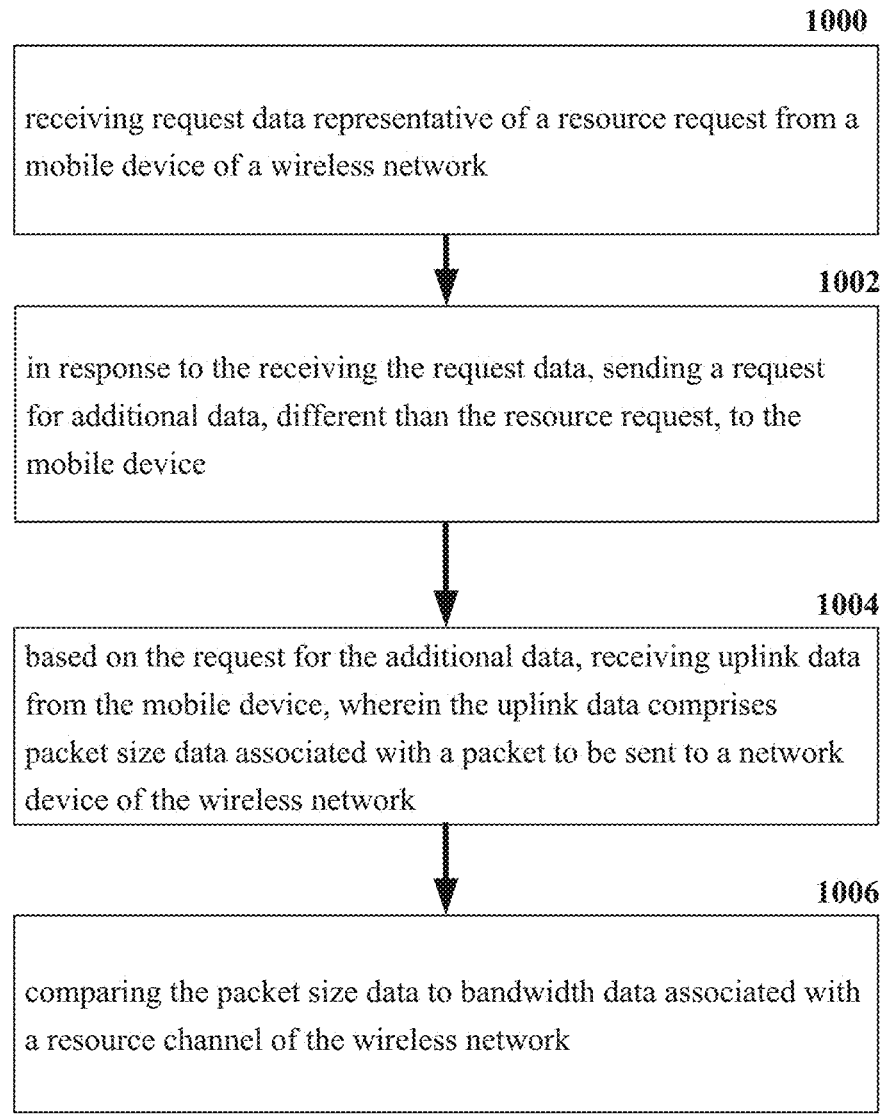
FIG. 10 illustrates an example flow diagram of a machine-readable medium for resource selection comprising comparing packet size data within a wireless mobility network according to one or more embodiments.

Referring now to FIG. 10, illustrated is an example flow diagram of a machine-readable medium for resource selection comprising comparing packet size data within a wireless mobility network according to one or more embodiments. At element 1000, the network node 104 can receive (e.g., via the communication component 302) request data representative of a resource request from a mobile device of a wireless network. At element 1002, in response to the receiving the request data, the network node can send (e.g., via the communication component 302) a request for additional data, different than the resource request, to the mobile device. Based on the request for the additional data, the network node 104 can receive (e.g., via the communication component 302) uplink data from the mobile device, wherein the uplink data comprises packet size data associated with a packet to be sent to a network device of the wireless network at element 1004. At element 1006, the network node 104 can compare (e.g., via the comparison component 304) the packet size data to bandwidth data associated with a resource channel of the wireless network.

Figure 11:
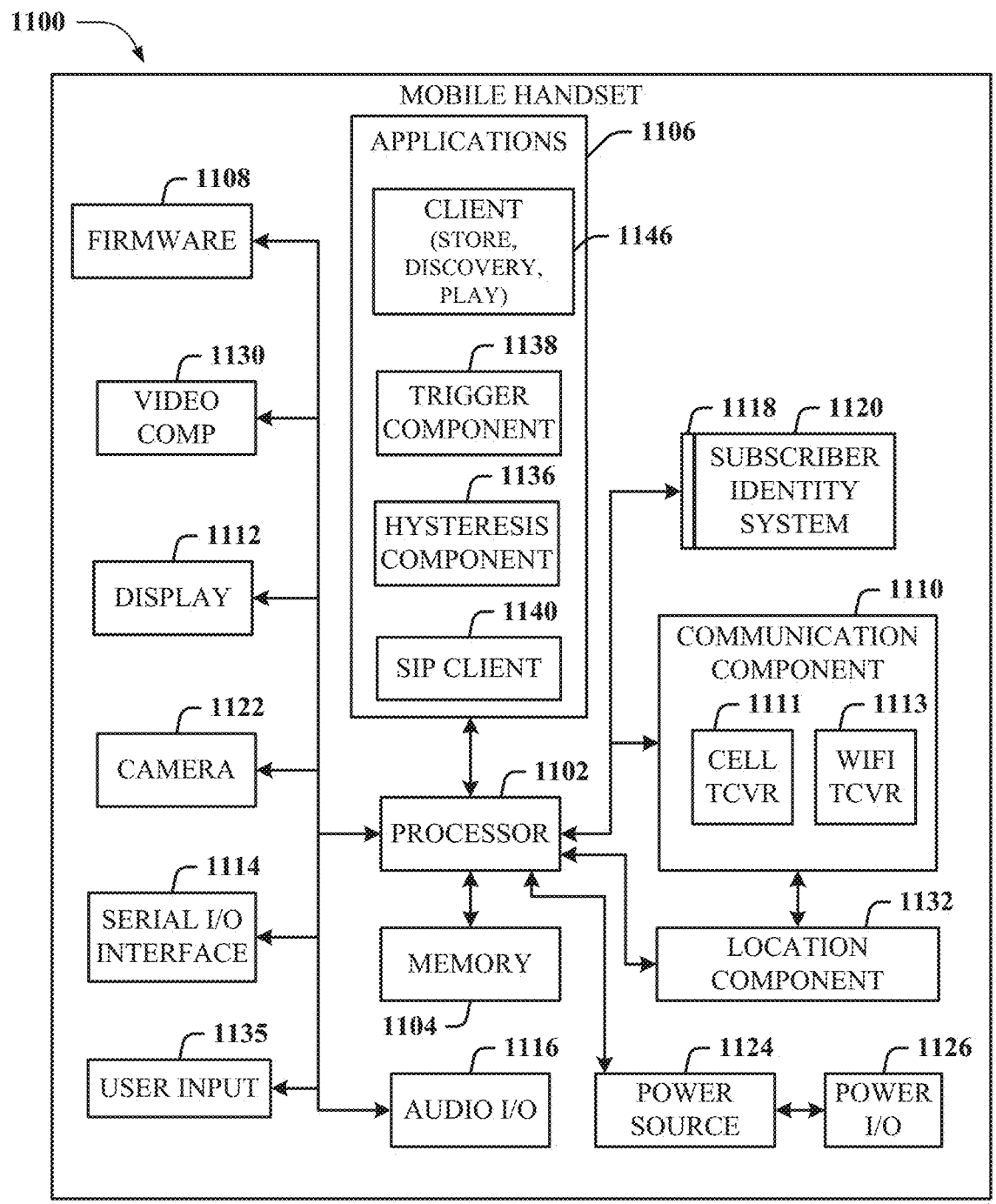
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
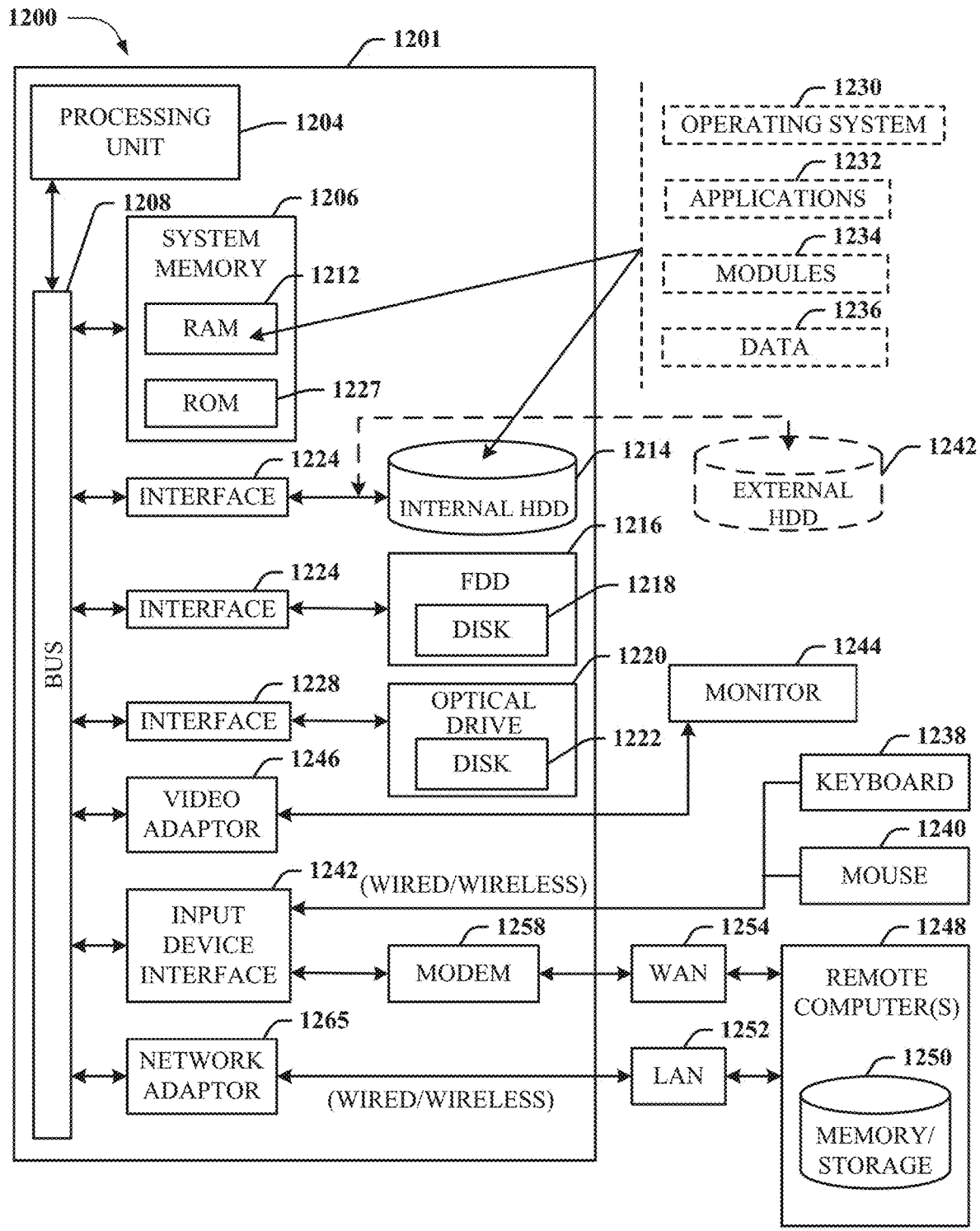
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive 1242 implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In LTE networks during the UE access process, resources are assigned by the LTE scheduler in the eNodeB. These resources are in the form of resource blocks, which comprise subcarriers in the channel assigned to the UE during access. The resource locks are allocated based on algorithms residing in the scheduler, which determine which UE to schedule, how to allocate resources to them and how to determine the appropriate power levels for each UE on each resource. The algorithms attempt to balance the desire for high throughputs, low latency, and fairness among the UEs under its control. However, there is no attempt made to allocate resources that would improve the utilization of the available spectrum. The above-disclosure describes leverages a method to implement a scheduler communication with the UE that will improve the utilization of the available spectrum.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a network device comprising a processor, a first signal representative of a capabilities report from a mobile device of a wireless network, wherein the first signal comprises synchronization signal sequence data representative of a synchronization signal sequence and preamble sequence data representative of a preamble sequence to be used by the network device;

sending, by the network device, a second signal representative of a request for additional data, to the mobile device, wherein the second signal comprises priority data representative of a priority associated with a wireless technology to be utilized by the mobile device;

in response to the sending and in accordance with the wireless technology, receiving, by the network device, the additional data, wherein the additional data comprises uplink data relating to an uplink channel of the mobile device to the network device;

determining, by the network device, a power level for an available resource to be allocated to the mobile device; and based on the power level and a bandwidth determined to be associated with a resource channel of the network device to the mobile device and further based on the additional data, allocating, by the network device, the available resource of the wireless network to the mobile device.

2. The method of claim 1, wherein the additional data comprises packet size data determined to be associated with a size of a traffic demand of the mobile device.

3. The method of claim 2, further comprising:
comparing, by the network device, the size of the traffic demand to the bandwidth represented by bandwidth data determined to be associated with the resource channel of the network device.

4. The method of claim 2, further comprising:
comparing, by the network device, the size of the traffic demand to a throughput capacity represented by throughput capacity data determined to be associated with the resource channel of the network device.

5. The method of claim 1, further comprising:
in response to the allocating the available resource, instructing, by the network device, the mobile device to remain on the resource channel of the network device.

6. The method of claim 1, wherein the resource channel is a first resource channel, and further comprising:
in response to the allocating the available resource, instructing, by the network device, the mobile device to communicate via a second resource channel of the network device different than the first resource channel.

7. The method of claim 6, further comprising:
instructing, by the network device, the mobile device to transmit channel quality indicator data representative of a channel quality associated with the second resource channel.

8. A system, comprising:
a processor; and
a memory that stores executable instructions that, when executed by the processor, facilitate performance of operations, comprising:
receiving a first signal from a mobile device of a wireless network, wherein the first signal comprises capability report data representative of a capability of the mobile device, and wherein the first signal comprises synchronization signal sequence data representative of a synchronization signal sequence and preamble sequence data representative of a preamble sequence to be used by a network device based on the capability of the mobile device;
sending a second signal to the mobile device via a first network device of the wireless network, wherein the second signal comprises buffer status request data representative of a request for a buffer status of a buffer, and wherein the second signal comprises priority data associated with a priority of a second network device technology of the wireless network to be utilized by the mobile device;
determining a power level associated with a resource being allocated to the mobile device;
in response to the sending of the second signal, receiving a third signal from the mobile device, wherein the third signal comprises buffer status data associated with the buffer; and
based on the power level and a result of comparing bandwidth data, representative of a resource channel bandwidth associated with a resource channel usable to access the resource of the wireless network, to the buffer status data, assigning the resource channel to the mobile device.

9. The system of claim 8, wherein the comparing comprises comparing a size of the buffer to the resource channel bandwidth.

10. The system of claim 8, wherein the receiving the third signal from the mobile device comprises repeatedly receiving channel quality indicator data associated with the resource channel.

11. The system of claim 8, wherein the assigning comprises performing the assigning in response to a condition associated with the mobile device being determined to have been satisfied.

12. The system of claim 11, wherein the condition is based on a numerical limit of mobile devices with respect to how many of the mobile devices are capable of communicating with network devices of the wireless network.

13. The system of claim 12, wherein the assigning is further based on the numerical limit of mobile devices, the resource channel bandwidth, and a capacity of the buffer.

14. The system of claim 9, wherein the operations further comprise:
sending instruction data to the mobile device, and wherein the instruction data comprises an instruction to remain on the resource channel.

15. A non-transitory machine-readable storage medium, comprising executable instructions that, when executed by a processor, facilitate performance of operations, comprising:
receiving request data, representative of a resource request for an available resource, from a mobile device of a wireless network, wherein the request data comprises synchronization signal sequence data representative of a synchronization signal sequence and preamble sequence data representative of a preamble sequence to be used by the wireless network;
sending wireless technology priority data representative of a wireless technology to be potentially utilized by the mobile device, to the mobile device;
in response to the sending the wireless technology priority data, receiving, additional data, wherein the additional data comprises uplink data relating to an uplink channel of the mobile device;
determining a power level associated with the mobile device to facilitate allocating the available resource to the mobile device; and
based on the power level, the wireless technology priority data, and a bandwidth determined to be associated with a resource channel of the wireless network, receiving uplink data from the mobile device, wherein the uplink data comprises the wireless technology to be utilized by the mobile device.

16. The non-transitory machine-readable storage medium of claim 15, wherein the operations further comprise:

comparing packet size data of the uplink data to bandwidth data associated with the resource channel of the wireless network.

17. The non-transitory machine-readable storage medium of claim 16, wherein the operations further comprise:
based on the comparing, selecting the resource channel for communication between the mobile device and a network device of the wireless network.

18. The non-transitory machine-readable storage medium of claim 17, wherein the resource channel supports a protocol associated with a transmission of a packet associated with the packet size data.

19. The non-transitory machine-readable storage medium of claim 16, wherein the resource channel is a first resource channel, and wherein the operations further comprise:
based on the comparing, selecting a second resource channel, different from the first resource channel, for a transmission of a packet between the mobile device and the network device.

20. The non-transitory machine-readable storage medium of claim 19, wherein the selecting is based on a defined number of mobile devices determined to be in communication with the network device.

* * * * *